(12) United States Patent
Buchali

(10) Patent No.: US 7,860,405 B2
(45) Date of Patent: Dec. 28, 2010

(54) DATA TRANSMISSION SYSTEM AND RECEIVER DEVICE FOR OPTICAL DATA SIGNALS

(75) Inventor: Fred Buchali, Waiblingen (DE)

(73) Assignee: Alcatel, Paris (FR)

( * ) Notice: Subject to any disclaimer, the term of this patent is extended or adjusted under 35 U.S.C. 154(b) by 828 days.

(21) Appl. No.: 10/816,939

(22) Filed: Apr. 5, 2004

(65) Prior Publication Data

US 2004/0213585 A1  Oct. 28, 2004

(30) Foreign Application Priority Data

Apr. 22, 2003 (EP) .................................. 03360051

(51) Int. Cl.
*H04B 10/06* (2006.01)
(52) U.S. Cl. ...................... 398/202; 398/149; 398/155
(58) Field of Classification Search ................ 398/148, 398/155, 159, 48, 149, 202–207
See application file for complete search history.

(56) References Cited

U.S. PATENT DOCUMENTS

| 5,706,113 | A | 1/1998 | Kamatani |
| 5,760,948 | A | 6/1998 | Bigo |
| 5,774,002 | A | 6/1998 | Guo |
| 6,909,309 | B2 * | 6/2005 | Green .......................... 326/115 |
| 7,095,816 | B2 * | 8/2006 | Kishine et al. ............... 375/355 |
| 7,158,727 | B2 * | 1/2007 | Pathak et al. ................. 398/155 |
| 7,386,042 | B1 * | 6/2008 | Brewer ......................... 375/226 |
| 2002/0027692 | A1 * | 3/2002 | Uchiyama et al. ............ 359/158 |
| 2002/0039211 | A1 * | 4/2002 | Shen et al. ................... 359/110 |
| 2002/0110215 | A1 * | 8/2002 | Hendrickson ................ 375/376 |
| 2003/0020985 | A1 * | 1/2003 | LaGasse et al. ............. 359/135 |
| 2003/0020987 | A1 * | 1/2003 | Kanesaka .................... 359/158 |

FOREIGN PATENT DOCUMENTS

FR  2 491 702 A  4/1982

OTHER PUBLICATIONS

Govind P. Agrawal, Fiber-Optic Communication Systems, 2$^{nd}$ Edition, Wiley, NY, 1997, pp. 159-160.

* cited by examiner

*Primary Examiner*—Dzung D Tran
(74) *Attorney, Agent, or Firm*—Sughrue Mion, PLLC

(57) ABSTRACT

A receiver device for optical data signals, in particular optical data signals in the Gb/s range, comprising an opto-electrical conversion unit, a frequency multiplicator unit (24) for frequency-multiplying the converted electrical data signal, and a clock recovery unit is characterized in that the frequency multiplicator unit (24) performs a frequency multiplication by a factor of n, with n being a natural number larger than 2. The receiver device has an improved tolerance on dispersion as far as generating a clock line is concerned.

5 Claims, 3 Drawing Sheets

DATA TRANSMISSION SYSTEM AND RECEIVER DEVICE FOR OPTICAL DATA SIGNALS

BACKGROUND OF THE INVENTION

The invention is based on a priority application EP 03 360 051.1 which is hereby incorporated by reference.

The invention relates to a receiver device for optical data signals, in particular optical data signals in the Gb/s range, comprising an opto-electrical conversion unit, a frequency multiplicator unit for frequency-multiplying the converted electrical data signal, and a clock recovery unit.

A receiver device of such type is disclosed in G. P. Agrawal, Fiber-Optic Communication Systems, $2^{nd}$ edition, Wiley, N.Y., 1997, page 159-160.

Devices for reading out optical data signals consist of an opto-electric conversion unit, a decision circuit and a clock recovery circuit. The clock recovery circuit's purpose is to isolate the spectral component at the bit rate frequency B. In return to zero (RZ) signals, the data signal contains a clock line at the bit rate frequency, and the clock line can be isolated by appropriate band pass filtering. The clock line is used for timing the decision circuit.

In non return to zero signals (NRZ), the data signal does not contain a clock line at the bit rate frequency. In this case, a frequency doubling (sometimes referred to as squaring) is performed with the received optical signal after its conversion into an electric signal. The spectral components originally symmetrically around half the bit rate frequency B/2 are used as the clock line then. A similar procedure can be performed with RZ signals if the clock line in the original signal is too weak for some reason.

When transmitting high bit rate optical signals in optical fibers over long distances, the optical signal is subject to dispersion, in particular polarization mode dispersion (PMD) and chromatic dispersion (CD). These dispersion effects reduce the optical power within the transmitted optic signal, in particular in the frequency range of half the bit rate B/2. As a result, after frequency doubling, the clock line at the bit rate frequency B is very weak, often too weak for a reliable data recovery. For this reason, expensive dispersion compensation equipment has to be applied in order to improve the clock line generation.

SUMMARY OF THE INVENTION

It is the object of this invention to introduce a receiver device for optical data signals, in particular NRZ signals, which has an improved tolerance on dispersion, in particular PMD, as far as generating a clock line is concerned.

This object is achieved, in accordance with the invention, by a receiver device for optical data signals as introduced in the beginning, characterized in that the frequency multiplicator unit performs a frequency multiplication by a factor of n, with n being a natural number larger than 2.

The low frequency part of the optical signal is hardly susceptible to dispersion and maintains its optical power at a relatively high level, i.e. power fluctuations are only minimal. By the frequency multiplication process, this high power part of the optical signal can be projected to higher frequencies and used for generating clock lines at these higher frequencies.

Surprisingly, a clock signal at exactly the bit rate frequency can be generated not only by frequency doubling (n=2), but with any higher multipliers n of the natural series, too. The part of the frequency spectrum of the optical signal which is responsible for the generation of a clock line at the bit rate frequency B is a frequency region symmetrically around B/n. PMD effects attenuate the optical power of the optical signal (and thus the electrical signal) above all in a frequency region at half the bit rate B/2. Already with n=3, a considerable boost in the intensity of the generated clock line at the bit rate frequency B can be achieved due to the decreasing effect of dispersion at lower frequencies of B/3 and below.

In conventional frequency doubling, a bit series of "01 01 01" is used for generating the clock line at the bit rate frequency B. Dispersion can distort this series easily into a "½½½½½½" series, from which no clock line can be generated any more. According to the invention, a longer bit series comprising at least 3 bits is applied for generating the clock line, which is much more difficult to distort to an equally drastic extent.

A preferred embodiment of the inventive receiver device is characterized in that the receiver device comprises a frequency filter for the spectral power of the electrical data signal, wherein the frequency filter transmits symmetrical around B/n, wherein B is the bit rate of the electrical data signal. Since the decisive frequency range for generating the clock line at the bit rate frequency B is the broadband neighborhood of the frequency B/n, unused parts of the electrical data signal can be neglected during frequency multiplication, thus easing the multiplication process and increasing the efficiency of the receiver device.

In a highly preferred embodiment, n is 4. A quadrupling of the frequency is relatively easy to perform, and the attenuation of the spectral power at B/4 due to PMD is only marginal. In this embodiment, a bit series of 0011 generates the clock line at the bit rate frequency after multiplication.

Also preferred is an embodiment of the inventive receiver device wherein the optical data signals are Gb/s signals, in particular 10 Gb/s signals or 40 Gb/s signals. Dispersion effects are particularly strong at these high bit rates, so the advantages of the invention are particularly relevant.

In another embodiment, the clock recovery unit comprises a phase locked loop (PLL) circuit. The PLL circuit is a standard element, operating up to high bit rates.

In an alternative embodiment, the clock recovery unit comprises a filter clock recovery circuit.

Also within the scope of the invention is a data transmission system comprising an optical transmission link, in particular an optical fiber system, wherein the optical transmission link has a significant dispersion, and an inventive receiver device as described above. In case of a significant dispersion in the optical transmission link, e.g. an attenuation of the optical power of more than 90% at B/2 compared with the optical power at B/4, the inventive receiver device is particularly useful and is the only known way to generate a sufficiently strong clock line at the bit rate frequency.

Also within the scope of the invention is a computer software for generating a clock signal out of an electrical data signal, in particular out of an electrical signal in the Gb/s range, wherein the electrical data signal is subjected to a frequency multiplication by a factor of n, with n being a natural number larger than 2, in particular n=4.

BRIEF DESCRIPTION OF THE DRAWINGS

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

The invention is described in the drawings.

FIG. 1 shows the power spectrum 1 of a typical NRZ optical data signal of a bit rate of 10 Gb/s. The power p is indicated on a logarithmic scale versus the frequency f. At low frequencies, the power (per frequency interval) is almost constant, in particular around 2.5 GHz, and up to about 4 GHz. At 5 GHz, i.e. at half the bit rate frequency of 10 GHz, the power spectrum has a sharp local minimum due to polarization mode dispersion (PMD) losses.

Figure 1:
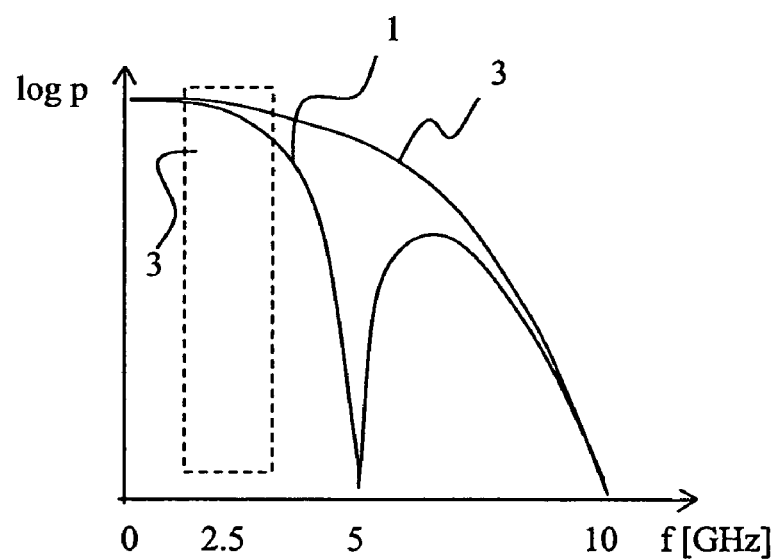
FIG. 1 shows the power of a dispersion-affected optical signal as a function of frequency.

The optical power also decreases as a function of frequency in general, making it impossible to filter out a clock line at 10 GHz directly.

A part of the spectrum suitable for a frequency multiplication in accordance with the invention is marked within a rectangular box 2. The power spectrum of an optical signal not subject to PMD is marked with reference numeral 3.

Figure 2:
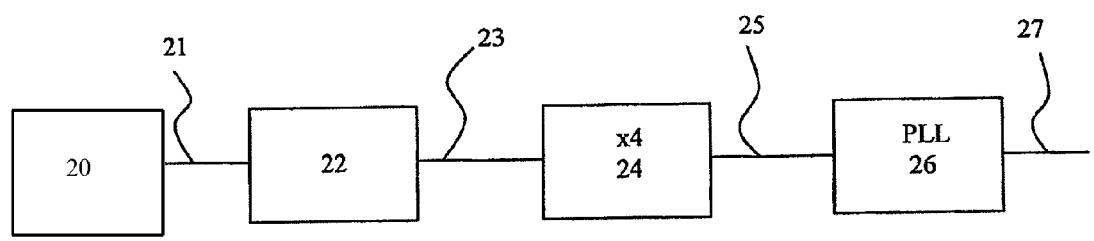
FIG. 2 shows the schematic setup of an embodiment of an inventive receiver device.

FIG. 2 shows the functional units of an inventive receiver device for optical data signals. After an opto-electronic conversion at the opto-electrical conversion unit 20, an electrical data signal 21 is fed into a frequency filter 22, filtering out all frequency parts of the electric data signal higher than ½ th of the bit rate B. In case of the 10 Gbit/s signal of FIG. 1, all frequency parts higher than 5 GHz are filtered out. A filtered electrical data signal 23 is fed into a frequency multiplicator unit 24, multiplying the filtered electrical data signal 23 by a factor of 4.

For this multiplication process, the spectral parts of the data signal symmetrically around ¼ of the bitrate frequency are multiplied times 4 generating a clock line at bitrate frequency. The highest frequency spectral parts for multiplication are at half of bitrate frequency.

The multiplied electric data signal 25 is fed into a PLL circuit 26 which in turn generates a clock signal 27 consisting of pulses of a frequency of the bit rate B, here 10 GHz.

Figure 3:
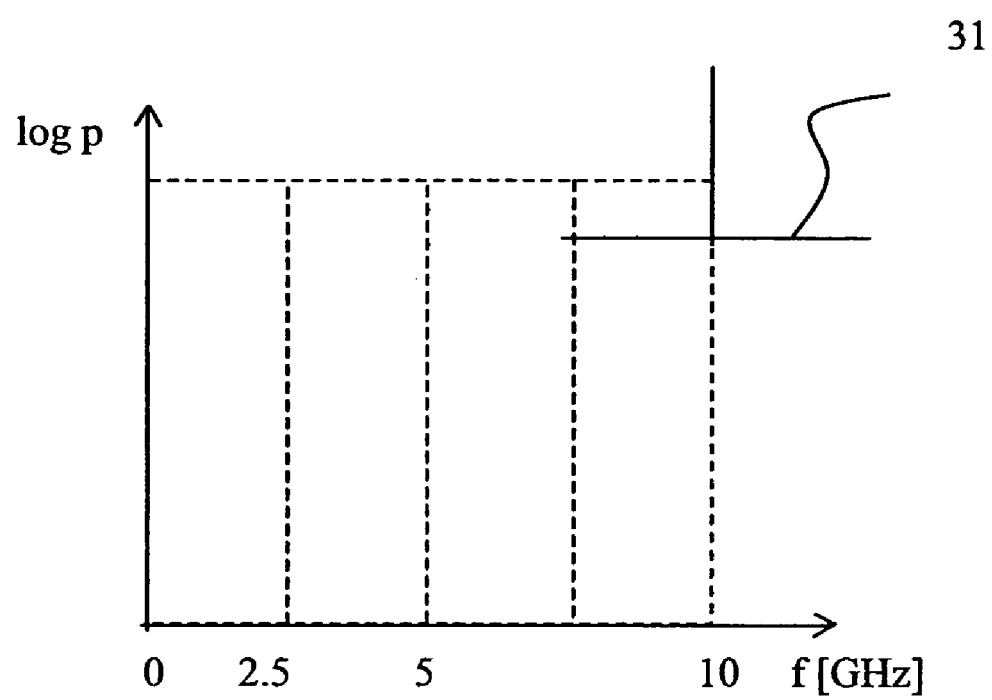
FIG. 3 shows the power of an electric signal as a function of frequency as generated by the setup of FIG. 2.

FIG. 3 shows the power spectrum 31 of the multiplied electrical data signal marked with reference numeral 25 in FIG. 2. The power p is indicated on a logarithmic scale versus the frequency f. Independent of the frequency, the multiplied electrical data signal has a high and almost constant power (per frequency interval) around the clock frequency. In particular, a clock line at 10 GHz is well detectable and can be singled out by an appropriate band pass filter. The intensity of the clock line is almost independent of the dispersion of the original optical signal.

The invention claimed is:

1. Receiver device for optical data signals, in particular optical data signals in the Gb/s range, comprising:
    an opto-electrical conversion unit, which converts an optical signal, that is received from a source external to said receiver device, to a converted electrical data signal;
    a frequency filter for the spectral power of the converted electrical data signal, the frequency filter providing a filtered converted electrical data signal;
    a frequency multiplicator unit, which frequency-multiplies the filtered converted electrical data signal, thereby producing a frequency-multiplied signal; and
    a clock recovery unit comprising a phased locked loop circuit,
    wherein the frequency-multiplied signal is used to drive the phase locked loop circuit;
    wherein the frequency multiplicator unit performs a frequency multiplication by a factor of n, with n being a natural number larger than 2,
    wherein the frequency filter transmits only around B/n, wherein B is the bit rate of the electrical data signal, and
    wherein said frequency multiplication is an analog signal processing technique.

2. Receiver device according to claim 1, wherein n=4.

3. Receiver device according to claim 1, wherein the optical data signals are 10 Gb/s signals or 40 Gb/s signals.

4. Receiver device according to claim 1, wherein the clock recovery unit comprises a filter clock recovery circuit.

5. Data transmission system comprising an optical transmission link, in particular an optical fiber system, wherein the optical transmission link has a significant dispersion, and a receiver device according to claim 1.

* * * * *